United States Patent [19]

Youlton

[11] Patent Number: 5,770,893
[45] Date of Patent: Jun. 23, 1998

[54] WAVE ENERGY DEVICE

[76] Inventor: Rodney Graham Youlton, Embley, White Cross Road, East Harptree, Bristol BS18 6AA, Great Britain

[21] Appl. No.: 656,201
[22] PCT Filed: Apr. 7, 1995
[86] PCT No.: PCT/GB95/00793
§ 371 Date: Jul. 9, 1996
§ 102(e) Date: Jul. 9, 1996
[87] PCT Pub. No.: WO95/27850
PCT Pub. Date: Oct. 19, 1995

[30] Foreign Application Priority Data

| Apr. 8, 1994 | [GB] | United Kingdom | 9406964 |
| Jan. 20, 1995 | [GB] | United Kingdom | 9501107 |

[51] Int. Cl.$^6$ .................................................. F03B 13/12
[52] U.S. Cl. ............................... 290/53; 290/42; 290/43; 60/398; 60/497; 60/505
[58] Field of Search ............................... 290/42, 43, 53, 290/54; 60/398, 495, 496, 497, 501, 502, 503, 505

[56] References Cited

U.S. PATENT DOCUMENTS

| 3,064,137 | 11/1962 | Corbett, Jr. et al. | 290/53 |
| 3,200,255 | 8/1965 | Masuda | 290/42 |
| 3,250,220 | 5/1966 | Eslinger | 417/333 |
| 3,912,938 | 10/1975 | Filipenco | 290/53 |
| 3,922,739 | 12/1975 | Babintsev | 441/16 |
| 4,286,347 | 9/1981 | Modisette | 60/398 |
| 4,383,413 | 5/1983 | Wells | 60/497 |
| 4,441,316 | 4/1984 | Moody | 60/398 |
| 4,466,244 | 8/1984 | Wu | 60/398 |
| 4,719,754 | 1/1988 | Nishikawa | 60/501 |
| 4,914,915 | 4/1990 | Linderfelt | 60/502 |

FOREIGN PATENT DOCUMENTS

| 2028929 | 3/1980 | United Kingdom . |
| 2245031 | 12/1991 | United Kingdom . |
| 0088 | 3/1983 | WIPO . |
| 03045 | 5/1987 | WIPO . |

Primary Examiner—Steven L. Stephan
Assistant Examiner—Nicholas Ponomarenko
Attorney, Agent, or Firm—Bacon & Thomas

[57] ABSTRACT

A wave energy device comprising a tube assembly comprising a plurality of open pipes of different lengths and natural resonant frequencies each (FIG. 8) where each tube (13) floating upright in the water (FIG. 2), with the tower end of the tube open to the water and generally disposed below the effective wave base. There is an air column above the water in the tube. Turbine (17) is provided for harnessing power from fluctuations in the air column caused by the changing water level (16) in the tube as a result of the wave motion of the surrounding water (11).

12 Claims, 8 Drawing Sheets

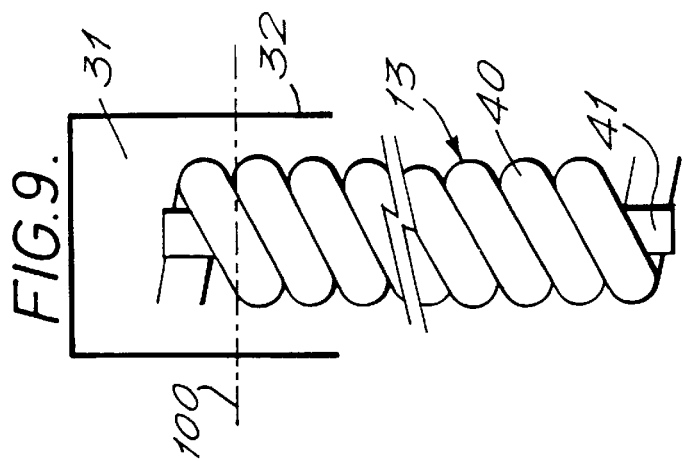
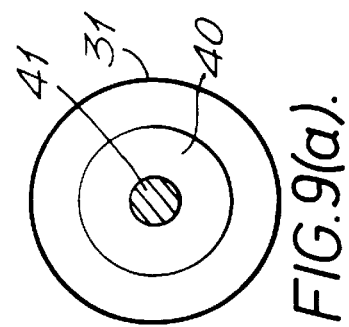
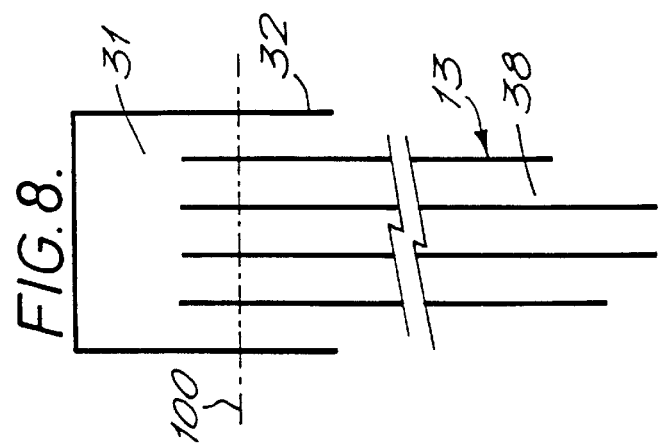
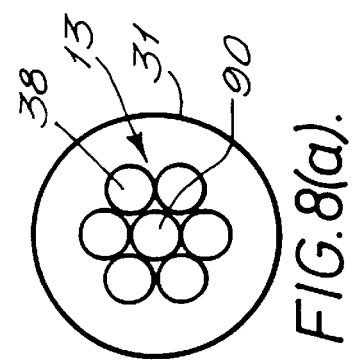
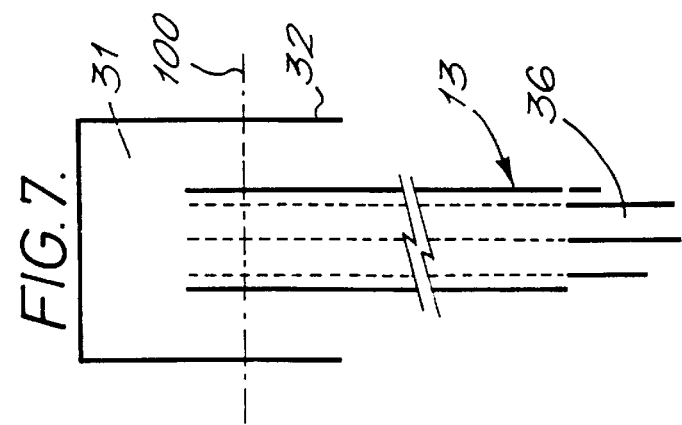
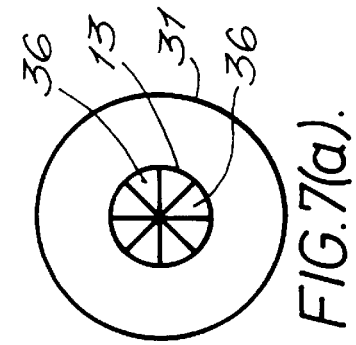

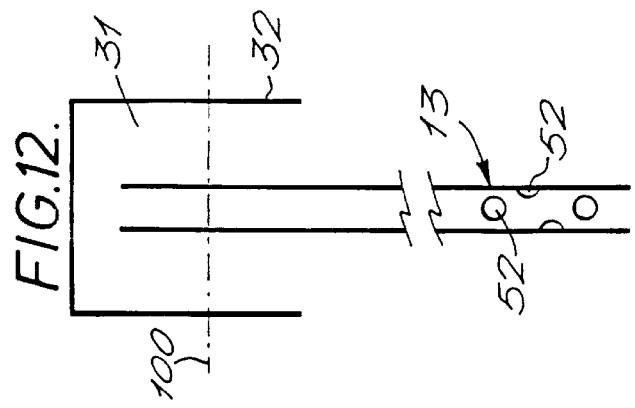
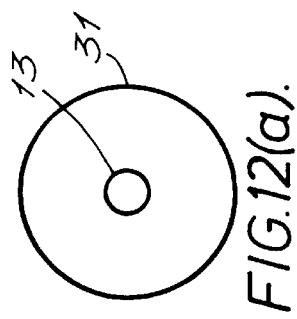
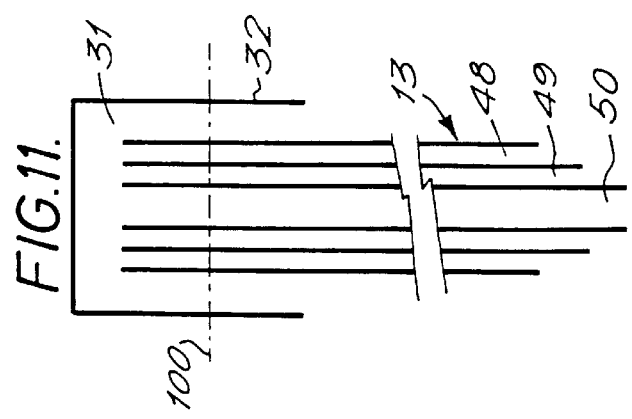
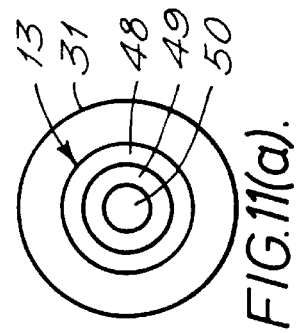
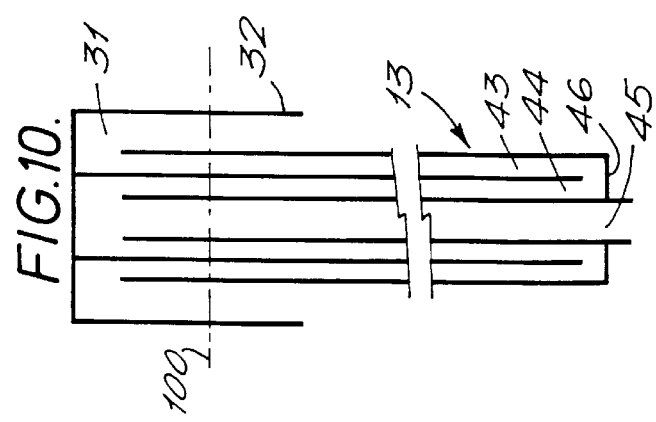
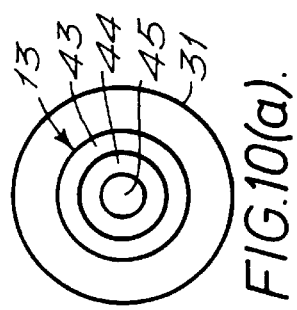

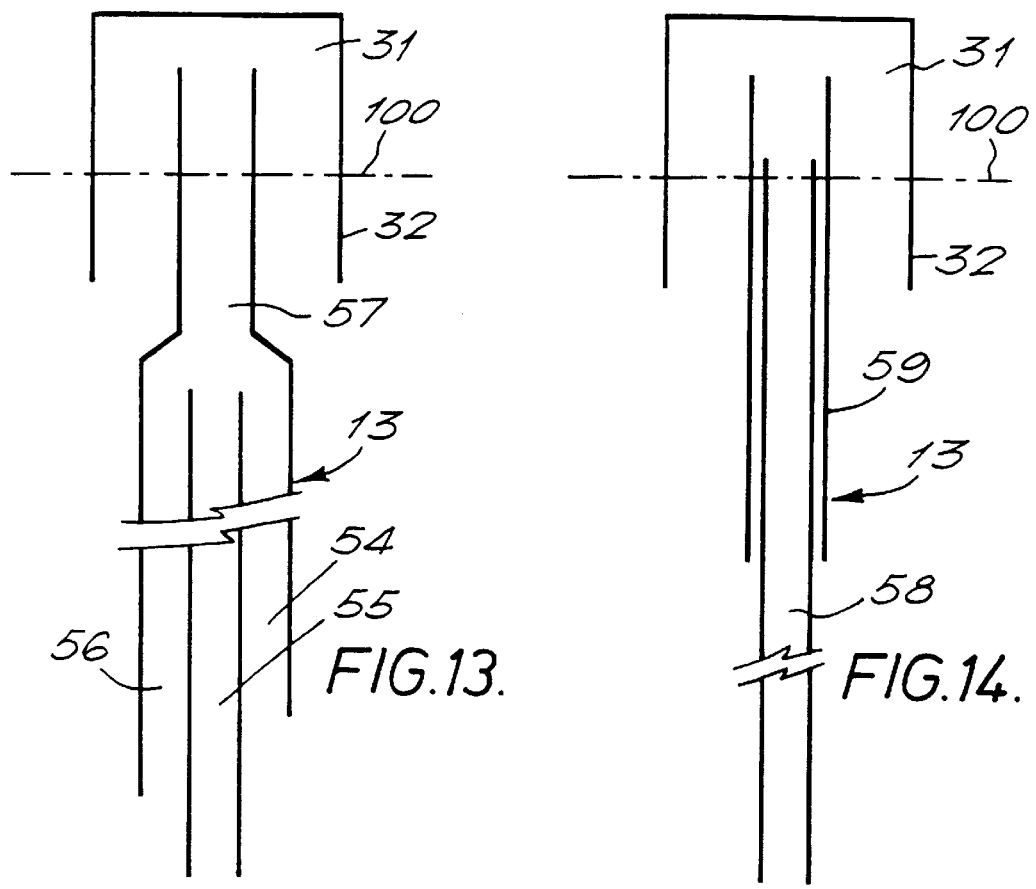
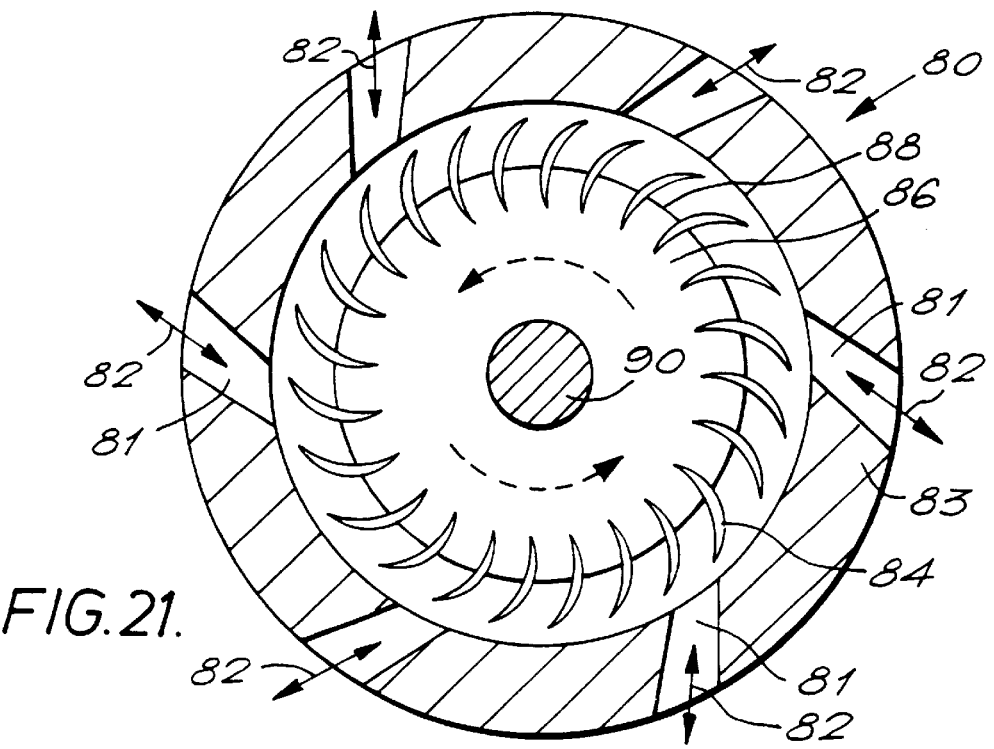

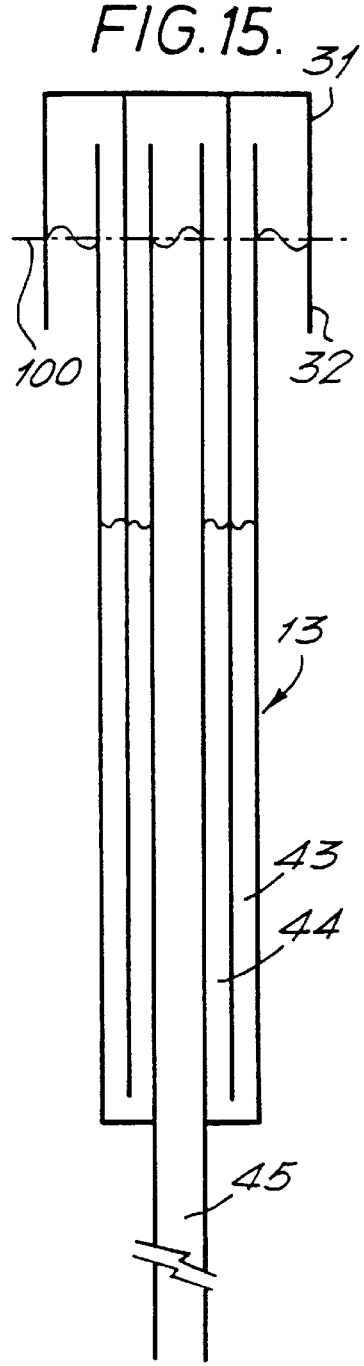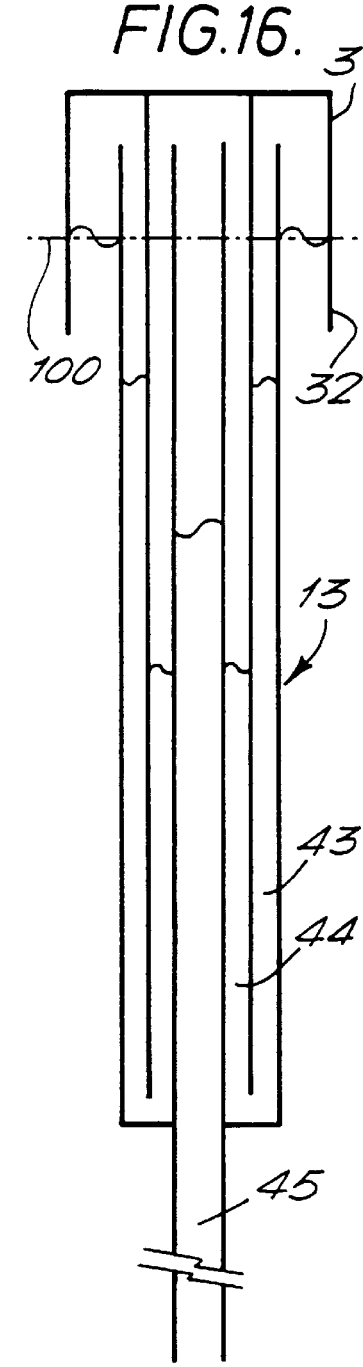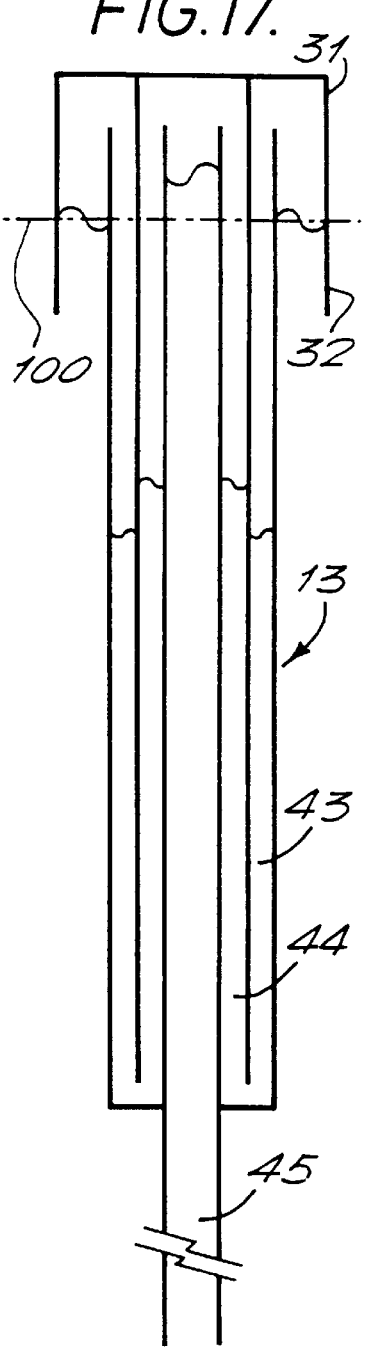

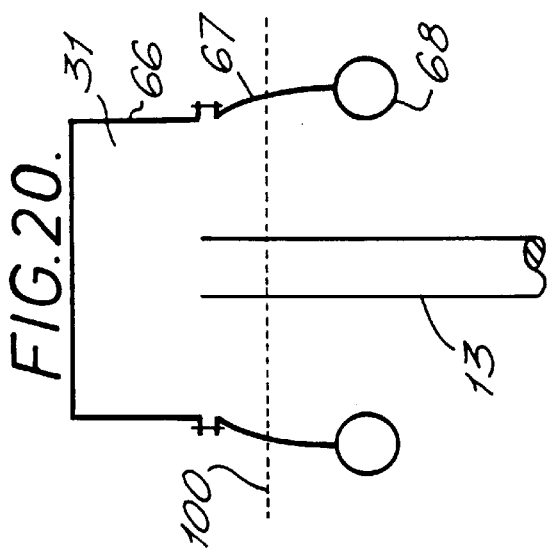
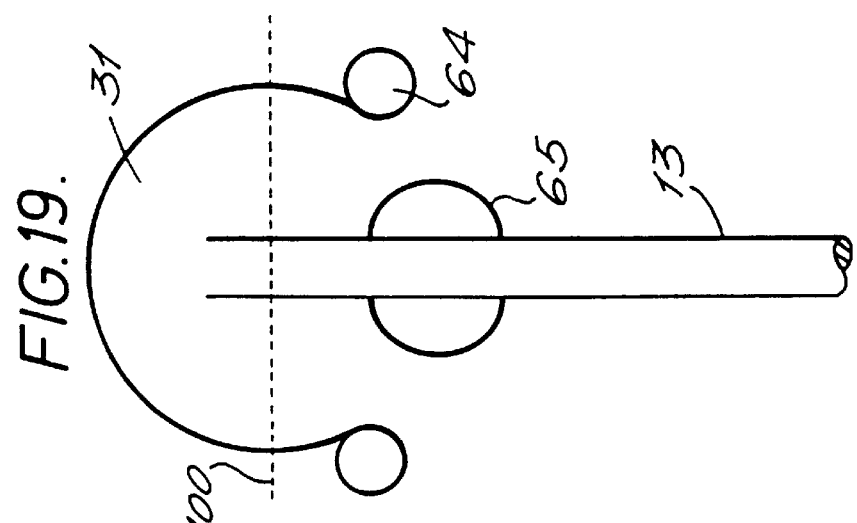
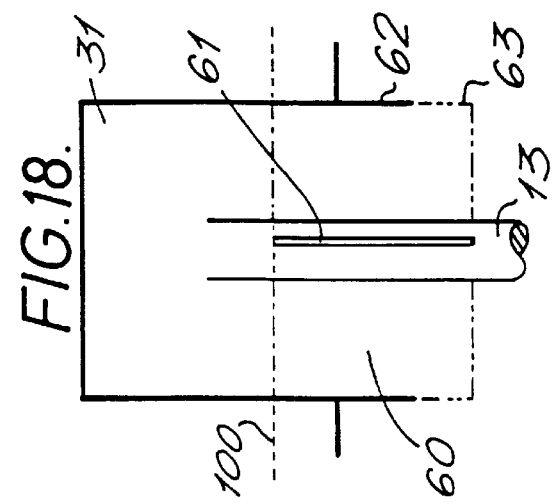
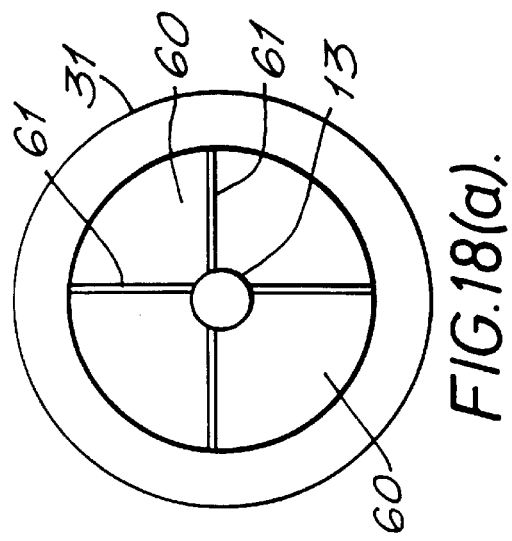

WAVE ENERGY DEVICE

The present invention relates to a wave energy devise for abstracting energy from a wave in a fluid. Particularly but not exclusively the device can be used in the offshore seaboard or on inland fresh water lakes or even in the deeper ocean.

There has been much research into the characteristics of waves. In an idealised wave situation there is a level below the mean fluid level below which the fluid is relatively undisturbed. This level is known as the effective wave base.

According to the present invention there is provided a wave energy device comprising a tube adapted to float upright in liquid with the lower end of the tube generally disposed below the effective wave base of the liquid and open to the liquid, and means for harnessing power from the changing fluid level in the tube relative to a datum on the tube.

Preferably there is provided a float arrangement associated with the tube and a ballast arrangement associated with the tube to assist the floating of the tube.

It is a preferred feature that the power harnessing means comprises a turbine rectifier which, in use, rotates in the same direction regardless of the through flow of liquid or gas.

Conveniently the turbine rectifier is mounted at the upper end of the tube and the turbine rectifier may also operate to atmosphere. Alternatively the turbine rectifier may operate into a plenum chamber.

Preferably the upper end of the tube is covered with an inverted cup member, the periphery of which extends into the fluid. When acted upon by a peaking wave, the fluid forces its way up the inside of the cup member which movement complements relative dropping of the fluid level in the tube and vice versa when the device is in the wave trough.

In a preferred arrangement the cup member is provided with a one way valve member which vents the inside to atmosphere if, during use, the pressure inside the cup member falls below atmospheric.

It is a preferred feature that the float arrangement comprises a float attached to the tube and/or a float attached to the cup member.

Preferably the tube has a constant cross section along a substantial proportion of its length.

In a preferred embodiment the tube may comprise an assembly of pipes of different lengths, at least one pipe extending below the effective wave base, thereby to increase the range of wave frequencies to which the device way respond.

The assembly may comprise a plurality of longitudinally extending radial segments of the tube, each radial segment being a pipe. Alternatively, the tube may comprise one or more bundles of individual pipes. In a further alternative the tube may comprise concentric pipes.

If the assembly comprises concentric pipes they may be in parallel, each having individual access to the water. Alternatively, the concentric pipes may form an annular continuous passage, thereby arranging the pipes in series.

In another embodiment of the invention the tube may be helical, or may comprise a plurality of intertwined helical tubes.

In yet another embodiment of the invention the tube may comprise one or more pipes having closable apertures at intervals in their side walls.

In another embodiment one or more of the pipes may be extendible.

In another embodiment, the cup 31 may be of cylindrical form, the space between the outer side of the tube and the inner side of the cup being divided vertically into segments formed by a number of interstitial walls extending above and below a lower rim of the cup.

In another embodiment the cup may be provided with a flange around its lower rim.

In another embodiment the cup may be of truncated spherical form. A toroidal float collar may be fixed to the lower rim of the cup. A collar float may be positioned around the tube.

An upper part of the cup may be of rigid construction and the lower part may be a flexible or semi-rigid skirt. The skirt may be provided with floats.

The device may include means for monitoring the wave spectrum of the water and means for controlling the lengths of said one or more extendible pipes, or means for controlling the opening and closing of said apertures, in accordance with signals generated by the monitoring means.

The invention will now be described by way of example only with reference to FIGS. 2–21 of the accompanying diagrammatic drawings in which.

FIGS. 6($a$) and 6($b$) show a further type of wave energy device according to the present invention, in peak and trough conditions respectively.

FIGS. 7–14 show further embodiments of the invention.

FIGS. 15–17 show various operations of the embodiment of FIG. 10.

FIGS. 18–20 show further embodiments applicable to the embodiments of FIGS. 6($a$)–17.

FIG. 21 shows a compound impulse/reaction turbine design to match a multiple pipe embodiment such as is shown in FIG. 8($a$).

Figure 1:
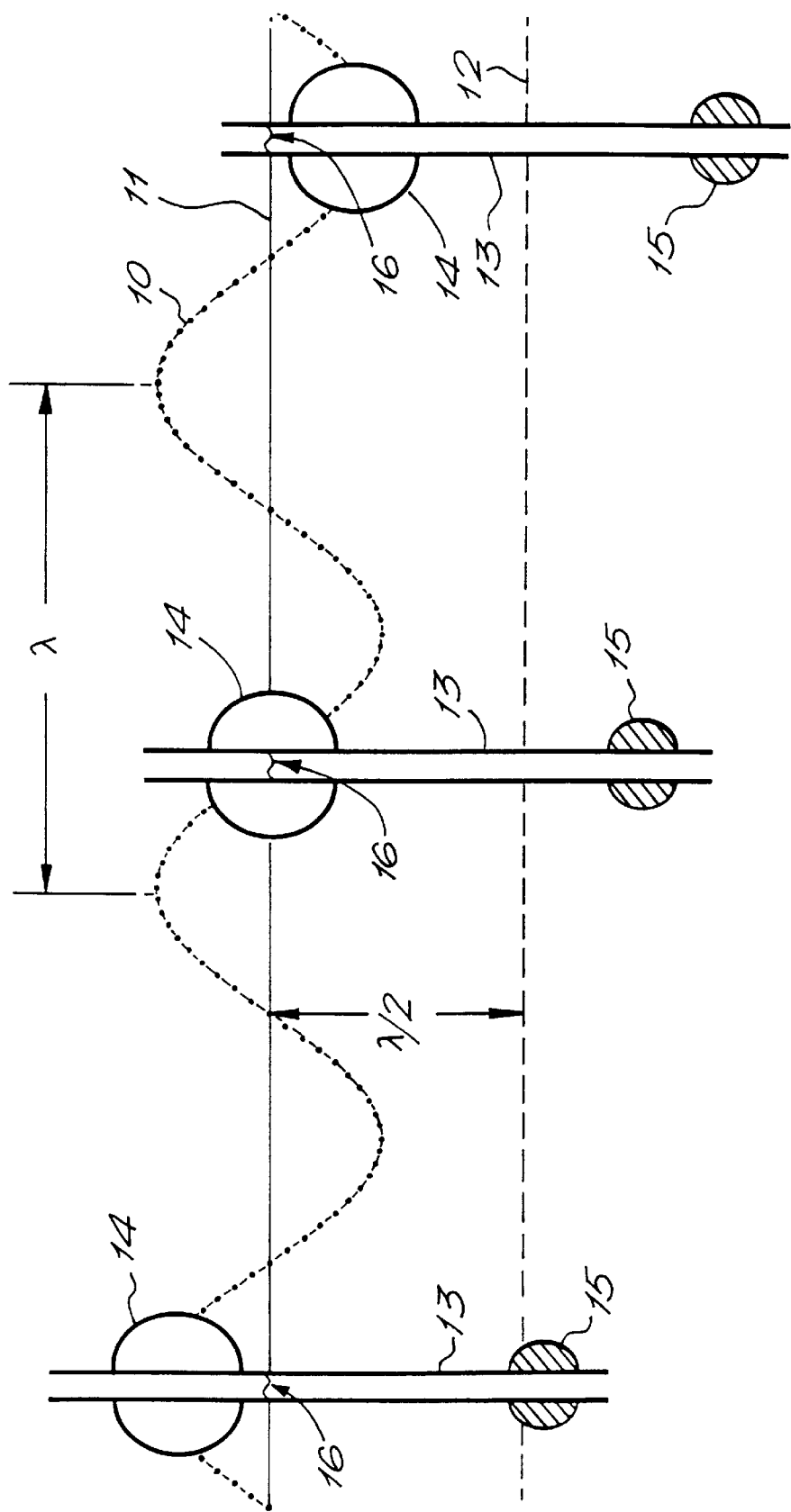
FIG. 1 illustrates the general behaviour of an open ended tube in a wave.

In FIG. 1 there is shown a representation of a wave 10 in a fluid e.g. water, the wave 10 being shown as having a theoretical, sinusoidal form for the sake of simplicity. It will be seen how the wave 10 deviates from the mean fluid level indicated by line 11. It has been found that below a certain depth 12 beneath a wave the water is relatively calm and undisturbed by the surface wave. This depth is known as the "effective wave base" and it has been found that this depth is about equal to about half the wave length "lambda". The depth may, however, be more or less than this depending on various factors and conditions.

FIG. 1 also shows a floating tube 13 having a float 14 and a ballast arrangement 15 spaced apart along its length such that the tube 13 floats generally upright in the water. The tube 13 is long enough to extend into the calm water below the effective wave base 12. The Figure shows the tube 13 at the peak of a wave, at the trough of a wave and at the mid-way position between the two.

Looking firstly at the midway position the tube is effectively floating at mean water level and the level of the water in the tube, shown as 16, is also at mean sea level. As the tube 13 rises on the crest of a wave, the lower end of the tube 13 remains below the effective wave base 12 and so if there were no fluid resistance in the tube the water level 16 in the tube will remain substantially at mean sea level 11. It will be appreciated that this results in a lengthening of the column of air between the water level 16 and the upper free end of the tube 13.

The tube 13 then passes the midway position until it reaches its trough position shown on the right of FIG. 1. Again, the lower end of the tube projects into the calm water below the effective wave base 12 and again in the absence of fluid resistance the water level 16 in the tube remains substantially at mean sea level 11. Clearly, the column of air between the water level 16 and the upper free end of the tube 13 has now been reduced.

Continuous rising and falling of the tube 13 on a wave 10 therefore results in an air column which oscillates relative to the tube. This moving air column, or even the water column below which also effectively oscillates, can be harnessed and converted into power. Abstraction of power will then affect the water level in the tube.

Figure 3:
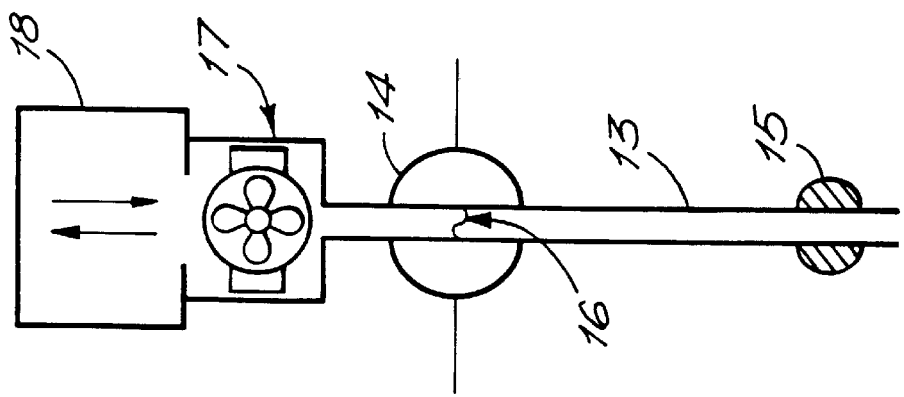
Figure 2:
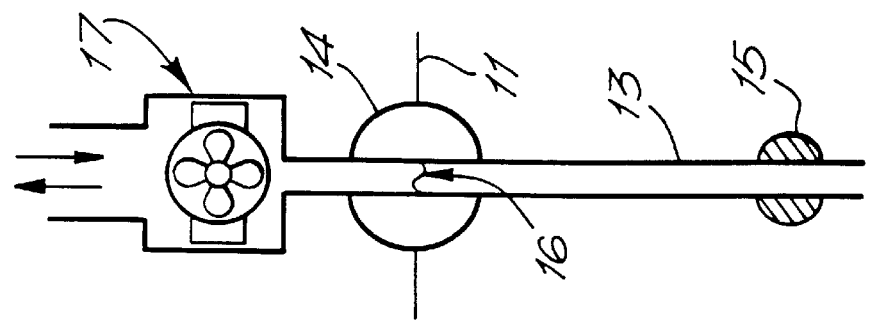
FIG. 2 shows a wave energy device according to the present invention.

In FIG. 2, a rectifying turbine 17 is attached to the top of the tube 13. The rotor of the turbine 17 rotates in the same direction regardless of the air moving through it. It will be seen that the turbine 17 operates to atmosphere. However, in FIG. 3 the turbine 17 operates with a closed plenum chamber 18 such that the oscillating air column is part of a closed system. This also gives the device a pneumatic spring effect. It would also be possible to replace the rectifying turbine with a conventional turbine in association with rectifying valves (e.g. flap, ball, fluidic gate, or other types).

Figure 4:
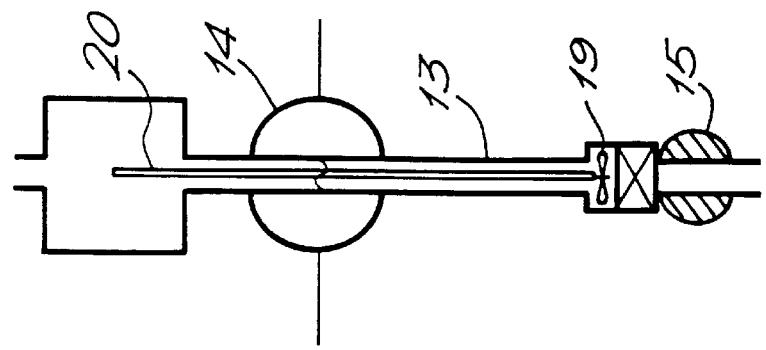

In FIG. 4 the tube is provided with a water turbine 19 located in the tube 13 so as to be operated by the oscillating water column. The turbine 19 has a power take-off shaft 20 and the device may also incorporate mechanical, hydraulic or electrical rectification.

Figure 5:
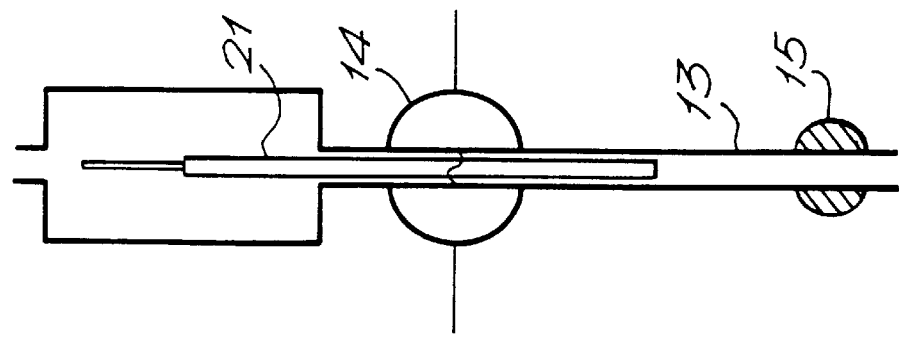
FIGS. 3–5 show further embodiments of a wave energy device according to the present invention.

In FIG. 5 there is an inner float 21 which floats on the water column in the tube 13. The vertical displacement of the inner float 21 in a wave can be harnessed mechanically, hydraulically or electrically to produce power.

Other ways of harnessing the power of the oscillating air/water column will, however, be apparent.

Figure 6A:
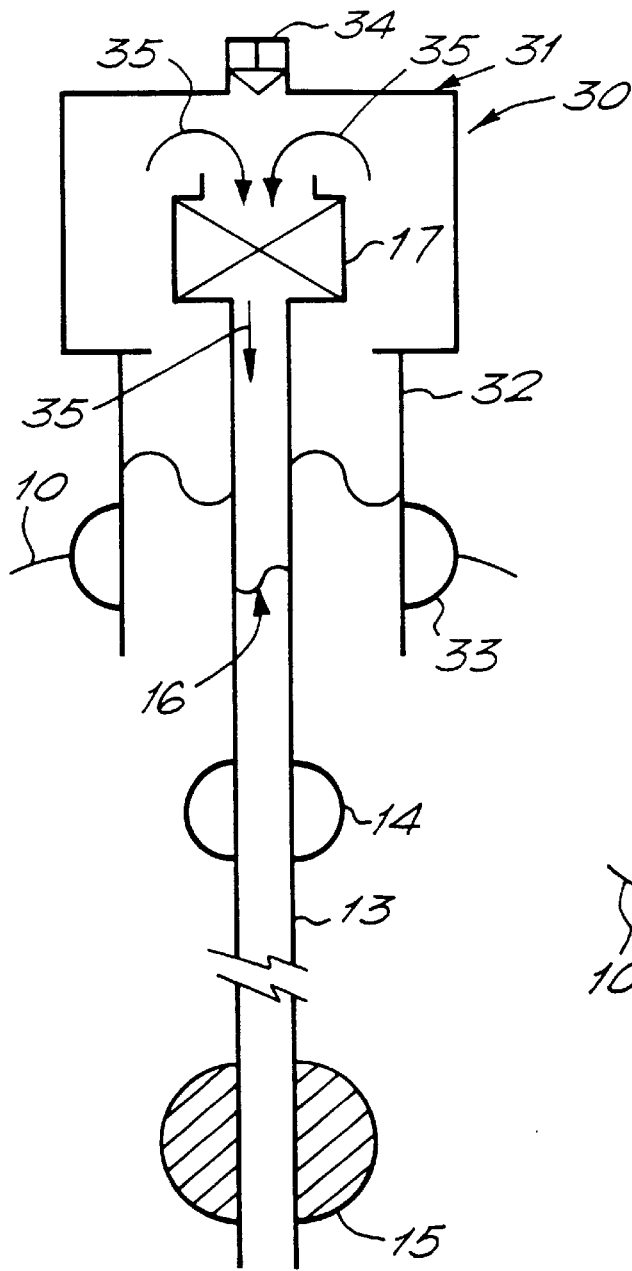
Figure 6B:
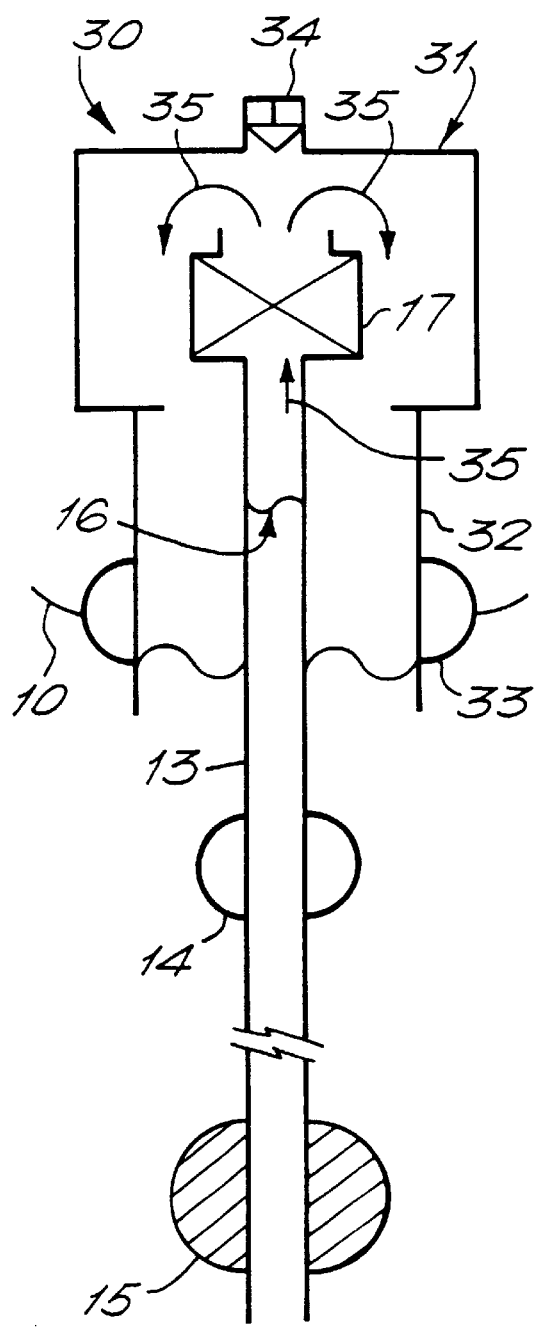

In FIGS. 6(a) and 6(b) there is shown a modified arrangement 30 which still incorporates a tube 13 which extends into the calm water below the effective wave base. The tube 13 also has a float 14, a ballast arrangement 15 and a rectifying turbine 17 at its upper end. Surrounding the turbine 17 and upper end of the tube 13 is a cup arrangement 31 of plenum having a downwardly extending cylinder 32 which in turn is provided with float means 33. The cup arrangement and cylinder are rigidly attached to the tube 13 and/or turbine by means which are not shown. It may, however, be desirable for there to be some possible movement between the cup and cylinder for adjustment and tuning purposes.

When put into water the cylinder extends into the water and the arrangement 30 is such that it floats with the tube 13 generally upright. An optional one-way valve 34 may be provided, which valve 34 is such that the inside of the cup member is vented to atmosphere it the inside pressure falls below atmospheric.

When the arrangement rises towards the peak of a wave (FIG. 6(a)), water surges upwards in the cylinder 32, often to a level above the water level of the wave, whilst at the same time the water level 16 in the tube 13 goes down relative to tho turbine 17. When the arrangement 30 falls towards the trough of a wave (FIG. 6(b)) the water surges downwardly in the cylinder 32, often to a level below the water level of the wave, and there is a complementary rise of the water level 16 in the tube 13 relative to the turbine 17.

It will be appreciated that the water level in the cylinder acts rather like a piston on the air within the cup arrangement 31 and above the column of water in the tube 13. The arrows 35 indicate the general flow of air through the turbine 17 during such wave movements.

In use of the arrangement 30 the water level in the cylinder should stay within the cylinder at all times even in the lowest wave trough. If air enters or leaves the cup arrangement 31 via the lower margin of the cylinder 32 then the dynamics of the arrangement could be altered to undesirable effect.

This is especially of concern in practice because the device will in reality probably tilt during the action of a wave and this tilting could result in a greater chance of air being lost from the plenum below the free edge of the cylinder. For this reason the valve 34 can be provided to vent the inside of the plenum to atmosphere.

The particular arrangement of floats 14, 33 and ballast 15 is illustrative only and would preferably be tunable so as to maximise the efficiency of the wave energy device in particular conditions. This is true for all embodiments of the invention. Also with reference to FIGS. 6(a) and 6(b) it will be clear that the turbine 17 could be replaced by other suitable harnessing means.

The ballast 15 can also act as a drogue against lateral or vertical movement of the device and improve efficiency. The ballast 15 and/or cylinder 32 and/or the tube 13 could also be shaped or have an appropriate cross-section so as to orientate the device in a particular way depending on prevailing winds or tidal streams. Alternatively or in addition, this could be achieved by the device having vanes for operation either by air or fluid flow.

Further embodiments of the invention will now be described with reference to FIGS. 7–17 in which mean sea level is indicated by chain line 100. FIGS. 7–17 also have features common to FIGS. 6(a) and 6(b), viz. plenum cup member 31 and downwardly extending cylinder 32. The cylinder 32 may possibly include the float 33 of FIGS. 6(a) and 6(b), but for clarity the float is not shown in FIGS. 7–17.

In FIG. 7 there is shown in vertical section a further embodiment of the floating tube 13 in which it is divided into eight radial segments or pipes 36, seven of which are truncated at their base to give pipes of different lengths—a "panpipes" set of different frequencies, the eighth segment remaining unshortened and extending below the effective wave bases FIG. 7(a) is a section through the tube 13 of FIG. 7 taken at line 100.

We have found, as shown in the embodiment of FIG. 7, that the range of wave frequencies to which the device is responsive is increased by virtue of the different resonant frequencies inherent in the pipe-like segments 36 of different lengths. This, in effect, facilitates broadband reception of wave frequencies.

Furthermore, an assembly of pipes 36 of different lengths will allow the possibility of harmonic interaction, i.e. interference or beat frequencies, which could contribute to the desirable objective of Extending the range of sea profiles or locations where the device may be usefully deployed. A problem experienced with earlier point-absorber devices is that their energy capture characteristic tends to be very peaky, centering on either the buoy heaving frequency or the single fluid column resonance, restricting the situations in which such single column devices may be used.

Nevertheless, for optimum efficiency, it is important for tubes 13 having multiple radial segments 36 of different lengths that at least one segment projects deep enough to be able to enter the relatively still water level of the effective wave base.

A further advantage of the embodiment of FIG. 7 is that the tube structure 13 has inherent structural strength by virtue of its segmentation.

In FIG. 8 there is shown in vertical section another embodiment of the tube 13 in which it is constructed of a bundle of pipes 38 of different lengths, one of the pipes being long enough to extend below the effective wave base. FIG. 8(*a*) is a section through the tube 13 of FIG. 8 taken at line 100. The feature 90 shown in FIG. 8(*a*) may be a central pipes as shown in FIG. 8, or it may be the axle of a turbine, which will be described below with reference to FIG. 21.

As with FIG. 7, the range of wave frequencies to which the device is responsive is increased by virtue of the different resonance frequencies inherent in the varying length pipes 38. The possibility of harmonic interaction also exists. The bundle of pipes 38 also has an inherently high degree of mechanical strength.

FIG. 9 shows in side view a tube 13 formed from a pipe or hose 40 helically wound around a central blank core 41. This has the advantage that the overall length of the water column can be substantially increased, with a lower resonance frequency, relative to the vertical height of the tube. FIG. 9(*a*) is a section through the tube 13 of FIG. 9 taken at line 100. In an alternative arrangement there may be provided two or more intertwined hoses 40, possibly of different lengths.

FIG. 10 shows a tube 13 comprising a bundle of concentric pipes 43, 44, 45. The outer pipe 43 is closed off at its lower end by a plate 46 which has a central aperture down through which the central pipe 45 passes to below the effective wave base. The middle pipe 44 does not extend down as far as the plate 46, but all three pipes are open at their top end. Hence, the pipes 43, 44, 45 define an annular continuous passage which puts the water columns within the pipes in series, rather than in parallel as in FIGS. 7 and 8. This particular construction of the tube 13 enables some degree of on-site tuning. FIG. 10(*a*) is a section through the tube of FIG. 10 taken at line 100. A more detailed description of its operation will be given below with reference to FIGS. 15–17.

FIG. 11 shows a tube 13 comprising a bundle of concentric pipes 48, 49, 50 wherein the bottom ends of the pipes are trimmed from the centre outwards to give a "panpipes" effect. Again, the central pipe 50 extends to below the effective wave base FIG. 11(*a*) is a section through the tube 13 of FIG. 11 taken at line 100.

FIG. 12 shows a tube 13 comprising a single pipe provided along its length with holes 52 adapted to be opened or closed by means (not shown) so that the resonant tube length can be tuned like a musical wind instrument. FIG. 12(*a*) is a section through the tube 13 of FIG. 12 taken at line 100.

FIG. 13 shows a variant of FIG. 8 in which a bundle of pipes 54, 55, 56 is collected together into a single pipe 57 below the water level 100. The summation of the individual pipe frequencies is combined within the water part of the column whereas in FIG. 8 this summation takes place within the air part of the column.

FIG. 14 shows a tube 13 which comprises a first pipe 58 telescopically inserted within a second pipe 59 so that the tube may be extended to a required resonance length by actuating means (not shown). The tube 13 is thus directly tunable.

With the embodiments of FIGS. 12 and 14 there may be provided means (not shown) for monitoring the wave spectrum of the water and controlling the resonance of the tube 13 accordingly so as to provide the optimum effect.

FIGS. 15–17 show a detailed further explanation of FIG. 10 above.

FIG. 15 shows a still-water situation in which the two annular columns between the mouth of the plenum cup 31 and the mouth of the central pipe 45 have been charged with water to the midway position and where pressures in each air column space are equalised. When subject to wave motion, all water and air columns will oscillate, in the direction senses indicated by the double arcs.

FIG. 16 shows a still-water situation in which, by injection of air into the innermost air space, a positive gauge pressure exists therein which alters the water/air column lengths as indicated, thus changing the spread of response frequencies for each annular component. A measure of on-site tuning is therefore possible. When subject to wave motion, all columns will oscillate in their altered modes. If an air turbine is being used to extract the energy, it will benefit from the slightly denser air in the aperture.

FIG. 17 shows the reverse of FIG. 16, whereby air has been exhausted from the innermost air space. Apart from reducing the air density slightly, it has similar positive attributes to the embodiment shown in FIG. 16.

For all those embodiments which include an inverted cup arrangement 31 as referred to above and schematically illustrated in FIGS. 6(*a*) and 6(*b*) through to FIG. 17 or any embodiment covered by the invention although not specifically illustrated, the cup has been indicated, for simplicity and generality, as being of cylindrical form. However, the cup 31 can take other forms in order to optimize energy capture at the wave surface and to further facilitate tuning and bandwidth, and also for reasons of structural strength.

Hence, with reference to FIGS. 18 to 20, alternative embodiments of the cup 31 will now be described.

FIG. 18 shows a version of the cup 31 having a cylindrical form but in this case with the space between the outer side of the tube 13 and the inner side of the cup being divided vertically into segments 60 formed by a number of interstitial walls 61 (four, for example, being depicted) which extend some way above and below a lower rim 62 of the cup. The disposition of the walls 61 is shown in FIG. 18(*a*) which is a section through the cup 31 of FIG. 18 taken at line 100.

FIG. 18 also shows the possibility of a flange-type extension 63 around the lower rim 62 of the cup 31 which could serve, together with the segment walls 61, to create a converging collection, containment and acceleration channel for the surface element of the wave and also, possibly, could reduce the chances of unwanted additional atmospheric air being sucked into the internal closed cycle working medium via vortices.

FIG. 19 shows an alternative cup 31 of truncated spherical form. It also indicates the possibility of affixing a toroidal float collar 64 to the lower rim 62 of the cup, the shape of which may be chosen so as to be conducive to a desirably smoother (i.e. laminar) water flow in and out of the bell-mouth of the cup. It also shows the possibility of positioning a collar float 65 around the tube 13, of a shape designed to interact favourably on the water flow patterns within the bell-mouth of the cup. The cup 31 is itself attached to the tube 13 by means not shown but which will be clear to the man skilled in the art. Such attaching means may be rigid or, alternatively, articulated: for example, to afford freedom for the leading edge (as seen with respect to wave direction) of the toroidal cup float collar 64 to lift and tilt the cup so as to face an oncoming wave and vice versa for the trailing edge to tilt the cup the other way as the wave departs, thus improving the scavenging action of the internal volume of the cup.

FIG. 20 shows a possible form of cup 31 where an upper part 66 is of rigid construction and a lower part 67 is a skirt of semi-rigid or flexible construction, similar to a hovercraft skirt. The skirt 67 may possibly be held open and/or articulated and/or weighted or provided with floats 68 in a manner adapted to achieve optimized energy capture.

FIGS. 18 to 20 are intended only to show the scope for design variants of the cup 31 and do not represent an exhaustive coverage of the possibilities arising out of the invention. Combinations and permutations of these and other variants will be apparent.

As mentioned above, power may be abstracted from the oscillating air/water columns in the tube 13 and the pipes which comprise it by means of a turbine. This turbine can be either a conventional axial, radial or mixed-flow unit operating in conjunction with rectifying valves; alternatively it may be one of the several designs available which are self-rectifying and hence unidirectional (for example, an axial-flow unit is used in many oscillating water column wavepower devices). In the case of a tube 13 comprising multiple pipe oscillators as envisaged in the present invention, it may be beneficial to employ specific turbine adaptations to suit the particular plural fluid flows generated.

By way of illustration, FIG. 21 shows a customised variant of a compound impulse/reaction turbine 80 to match a multiple pipe embodiment such as that shown in FIG. 8(a). The axle 90 of the turbine passes down between the six pipes 38 shown in FIG. 8(a).

The turbine 80 is provided with a casing 83 which has a number of circumferentially spaced inlet/outlet ports 81 corresponding to the pipes 38 The turbine 80 receives a counter-clockwise torque from each individual pipe airflow 82 through the ports 81, irrespective of flow direction, by a combination of aerodynamic lift reaction from the leading faces of the aerofoil or lenticular-profiled blades 84 mounted on the turbine rotor 88 and an impulse/drag force on the trailing faces of the blades.

The space 86 within the turbine rotor 88 represents a plenum, the volume of which can be varied—either by radiusing the turbine axle 90 or by connection to an additional buffer volume acting as a capacitance—to optimise the system.

Although six input/output paths 82 are shown in FIG. 21 (corresponding to the six pipes 38 of FIG. 8(a)) it will be understood that any physically possible number from one upwards may be used.

The example shown in FIG. 21 is illustrative only and does not preclude blade profiles other than lenticular, nor is it limited to the air side of the oscillating fluid columns but can apply mutatis mutandis to the water side.

In practice, the devices of the invention would be deployed either singly or in integral or close-coupled arrays or in spaced/phased arrays. They could be moored by direct sea anchor, by catenary or rigid or fixed links to adjacent mooring buoys or other adjacent devices, by shore based lines, by attachment to shore or seabed anchored spines, by streaming from or containment within seabed based structures or from or within mobile vessels or oil rigs. Other diverse options exist.

I claim:

1. A wave energy device comprising:

a) a tube assembly comprising a plurality of open pipes of different lengths and natural resonant frequencies each having an upper end and a lower end, the device being adapted to float upright in a body of water which is subject to waves so that the lower end of at least one of said pipes is generally disposed below the effective wave base of the water and is open to the water;

b) an inverted cup member covering the upper ends of the pipes, the cup member being such that when the device is in use the periphery of the cup member is below the surface of the water so that when the device is acted on by a peaking wave, water is forced up the inside of the cup member which movement complements relative dropping of the fluid in one of said pipes and vice versa when the device is in a wave trough; and c) means for harnessing power from the changing fluid levels in the cup member and pipes relative to a datum still water level as a result of the wave motion, the different lengths and natural resonant frequencies of the pipes serving to broaden the resonant frequency of the device to the wave motion and thereby the range of wave frequencies for which power is harnessed by said means.

2. A wave energy device as claimed in claim 1 wherein the upper end of the tube is covered with an inverted cup member, the periphery of which extends into the fluid, whereby, when acted upon by a peaking wave, the fluid forces its way up the inside of the cup member which movement complements relative dropping of the fluid level in the tube and vice versa when the device is in the wave trough.

3. A wave energy device as claimed in claim 1 wherein the cup member is provided with a one way valve member which vents the inside to atmosphere if, during use, the pressure inside the cup member falls below atmospheric.

4. A wave energy device as claimed in claim 1 wherein the assembly comprises a plurality of longitudinally extending radial segments of the tube, each radial segment being a pipe.

5. A wave energy device as claimed in claim 1 wherein the tube comprises one or more bundles of individual pipes.

6. A wave energy device as claimed in claim 1 wherein the tube comprises a plurality of concentric pipes.

7. A wave energy device as claimed in claim 6 wherein the pipes are in parallel, each having individual access to the liquid.

8. A wave energy device as claimed in claim 6 wherein the concentric pipes form an annular continuous passage, thereby being arranged in series.

9. A wave energy device as claimed in claim 1 wherein the tuba is helical.

10. A wave energy device as claimed in claim 1 wherein the tube comprises one or more pipes having closable apertures at intervals in their side walls.

11. A wave energy device as claimed in claim 1 wherein one or more of the pipes is extendible.

12. A wave energy device as claimed in claim 1 wherein the means for harnessing power comprises a turbine which, in use rotates in the same direction regardless of the through flow of liquid or gas and the turbine is provided with a casing having at least one inlet/outlet port arranged to receive an oscillating airflow from a respective pipe and to direct the airflow onto or across the blades of the turbines.

* * * * *